(12) United States Patent
Wang et al.

(10) Patent No.: US 7,474,464 B2
(45) Date of Patent: Jan. 6, 2009

(54) DIFFUSER PLATE WITH HIGHER LIGHT DIFFUSION EFFICIENCY AND BRIGHTNESS

(75) Inventors: Jyh Horng Wang, Jhongli (TW); Jen Huai Chang, Jhongli (TW); Tzung Yang Li, Jhongli (TW)

(73) Assignee: Entire Technology Co., Ltd., Taoyuan County (TW)

( * ) Notice: Subject to any disclaimer, the term of this patent is extended or adjusted under 35 U.S.C. 154(b) by 243 days.

(21) Appl. No.: 11/408,032

(22) Filed: Apr. 21, 2006

(65) Prior Publication Data
US 2007/0159699 A1 Jul. 12, 2007

(30) Foreign Application Priority Data
Jan. 12, 2006 (TW) .............................. 95101250 A

(51) Int. Cl.
G02B 5/02 (2006.01)
G02B 13/20 (2006.01)
G02F 1/1335 (2006.01)

(52) U.S. Cl. ............................ 359/599; 349/64; 349/95
(58) Field of Classification Search ................ 359/599; 362/617, 618, 620, 627; 349/57, 64, 95, 349/112
See application file for complete search history.

(56) References Cited

U.S. PATENT DOCUMENTS

| 5,592,332 | A | * | 1/1997 | Nishio et al. ................. 359/619 |
| 7,142,360 | B2 | * | 11/2006 | Umeya ........................ 359/443 |
| 7,158,298 | B2 | * | 1/2007 | Miyata et al. ............... 359/457 |
| 2004/0004770 | A1 | * | 1/2004 | Ebina et al. ................. 359/648 |

* cited by examiner

*Primary Examiner*—Alessandro Amari
(74) *Attorney, Agent, or Firm*—Rosenberg, Klein & Lee

(57) ABSTRACT

A diffuser plate with higher light diffusion efficiency and brightness applied to backlight module of Liquid Crystal Display TV (LCD TV) for providing uniform light is disclosed. An optical lens with a diffusion layer is disposed on one side of the substrate. The diffusion layer is arranged above the optical lens for enhancing diffusion effect. The other side of the diffuser plate can be a plane or having a lens structure. By Lenticular lens, the homogeneity of emitted light is improved so as to reduce the amount of diffusion particles being added into the diffusion plate Therefore, the light transmission is increased and the brightness is enhanced. Meanwhile, ability of shielding lamps is considered and Moiré effect is eliminated. Moreover, the diffusion layer is co-extruded on surface of the Lenticular lens together with the substrate so that the device is easy to be produced.

10 Claims, 3 Drawing Sheets

DIFFUSER PLATE WITH HIGHER LIGHT DIFFUSION EFFICIENCY AND BRIGHTNESS

BACKGROUND OF THE INVENTION

The present invention relates to a diffusion plate of a direct-type backlight module, especially to a diffusion plate that improves efficiency of light diffusion effect and enhances brightness.

Due to excellent display quality and low cost, the CRT monopolizes the market for quite a long time. However, for environmental protection as well as power saving, the CRT got a lot of problems and can't match requirements of compact size, light weight, and low power. Thus Thin Film Transistor Liquid Crystal Display (TFT-LCD) with features of high definition, space-saving, low power and no radiation has become mainstream. Inside the liquid crystal display, the Liquid crystal panel doesn't illuminate. Instead, a back light module is disposed under the liquid crystal panel as a light source.

The prosperous development of the TFT-LCD technology causes invention and demand of liquid crystal displays. The difference between the LCD TV and LCD monitor is in size, brightness and viewing angle. In order to meet requirements of large size and high brightness, the conventional edge-light backlight module is replaced by direct-type backlight module. Besides different numbers of lamps, a light guide panel is changed into a diffusion plate.

Refer to FIG. 1, a common direct-type backlight module consists of a refractor 10', a plurality of light sources 11', a light diffusion plate 12', a lower diffuser film 13', a prism sheet 14' and an upper diffuser film 15'. As to backlight module, there are five common ways for brightness enhancement. Firstly, two pieces of horizontal or vertical prism sheets are used. By refraction index and angle of the prisms, the incident light is refracted, passing through the serrated member for control of the refraction angle so as to collect the light already diffused, reduce light loss and enhance brightness. But on LCD TV, only horizontal prisms are applied for collecting light due to limits of horizontal view angle. Secondly, a multi-layer interference filter is applied. A multilayer film with feature of birefringence is made from two polymers with different refraction index by co-extrusion then stretching and lamination then stretching. The polarized light perpendicular to the interference filter is transmitted through directly while the polarized light parallel to the filter is reflected to the backlight and recycled. Thus more light is transmitted through he LCD and the luminance is increased. The film works through polarization recycling. It recycles most of the light that is normally lost in the rear polarizer. For example, a dual-brightness enhancement film (D-BEF) can be used. The third, a cholesteric reflective polarizer is used. The fourth, a fluorescent brightening layer that converts UV light from Cold Cathode Fluorescent Lamps into visible light is coated on the diffuser plate. The fifth, increase current or numbers of the Cold Cathode Fluorescent Lamp (or other light source). No matter increase lamps or add brightness enhancement film on the backlight module for brightness enhancement, the cost will increase. Take a backlight module of 32-inch LCD-TV as an example, key components—prism sheet accounts for about 38%, lamps 20%, diffusion sheet 4%, reflector 4% and diffuser plate 10%. Once the use of optical films is reduced, especially the prism sheet, the cost can be reduced.

Moreover, the integration of the diffusion plate is always concerns of backlight module manufactures and optical sheets producers. The related products can directly reduce cost of backlight modules and has great influence on manufacturing processes of the backlight modules.

SUMMARY OF THE INVENTION

Therefore it is a primary object of the present invention to provide a diffuser plate with higher light diffusion efficiency as well as higher brightness that includes an optical lens dispose over one side of a substrate so as to provide homogeneous light source. Also the number of diffusion particles is reduced. Therefore, high efficiency of light transmittance and diffusion is achieved. Moreover, the light diffusion effect is improved and the brightness is enhanced.

It is another object of the present invention to provide a diffuser plate with higher light diffusion efficiency as well as higher brightness having a diffusion layer disposed above the optical lens. The diffusion layer not only improves diffusion effect but also considers shielding of lamps, eliminates Moire effects, and enhances functions of the optical lens.

It is another object of the present invention to provide a diffuser plate with higher light diffusion efficiency as well as higher brightness. When the light passes through the optical lens, the light is dispersed by a surface of the optical lens on one side of the substrate and then is diffused by the diffusion layer of the optical lens so as to achieve high transmittance and diffusion effects. Thus the use of the diffusion sheets and prism sheets is reduced so as to reduce cost.

It is further object of the present invention to provide a diffuser plate with higher light diffusion efficiency as well as higher brightness with an ultraviolet light absorbing layer disposed under the other side of the substrate so as to avoid ageing or yellowing of the diffuser plate caused by long term UV radiation that damages molecular structure of the diffuser plate.

In order to achieve above objects, an optical lens on one side of a substrate in accordance with the present invention makes incident light disperse uniformly. By a diffusion layer above the optical lens, the light diffusion efficiency is improved, the ability to shield the lamp is considered and the moiré effect is eliminated. Moreover, a UV absorbing layer disposed under the other side of the substrate so as to avoid ageing or yellowing of the diffuser plate. Therefore, high transmittance and diffusion efficiency are achieved by use of the optical lens and the diffusion layer. Also the cost is reduced because that the use of diffusion sheets, prism sheets and brightness enhancement films is reduced.

BRIEF DESCRIPTION OF THE DRAWINGS

The structure and the technical means adopted by the present invention to achieve the above and other embodiments and the accompanying drawings, wherein.

DETAILED DESCRIPTION OF THE PREFFERED EMBODIMENT

A traditional direct-type backlight module is composed by a refractor, a plurality of light sources, a light diffusion plate, a lower diffuser film, a prism sheet and an upper diffuser film. While assembling, it's difficult, time-consuming and costly. The present invention provides a diffuser plate with higher light diffusion efficiency and brightness so as to simplify structure of the direct-type backlight module and further reduce manufacturing cost.

Figure 1:
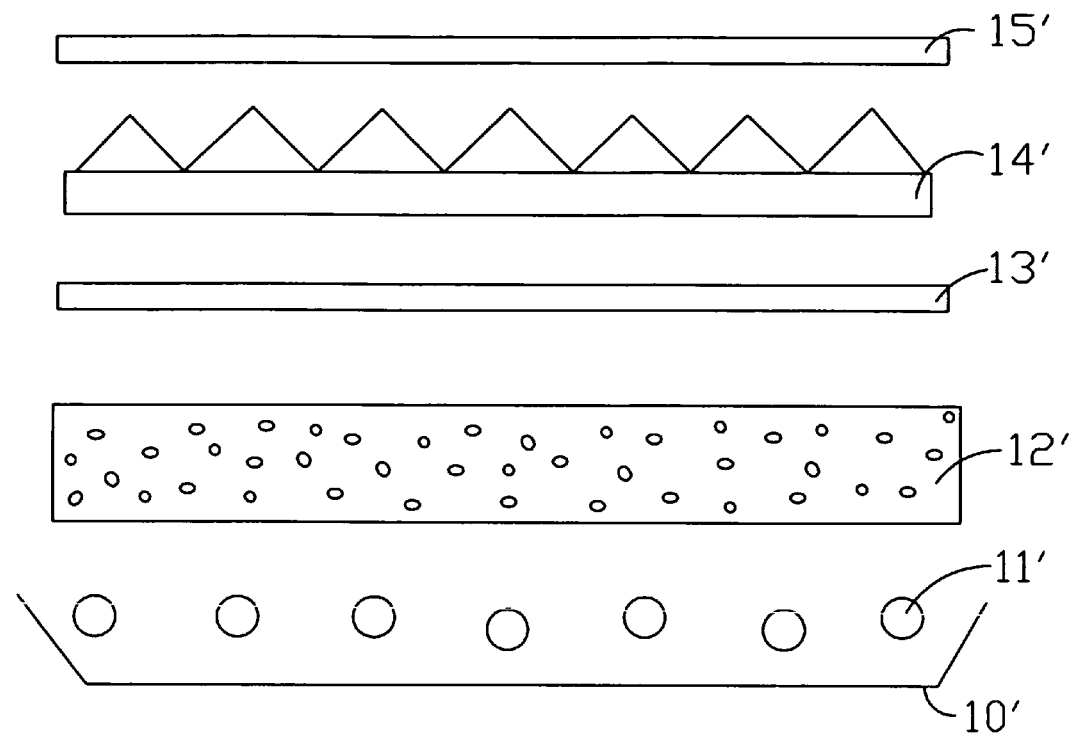
FIG. 1 is a schematic drawing of conventional direct-type backlight module.
Figure 2:
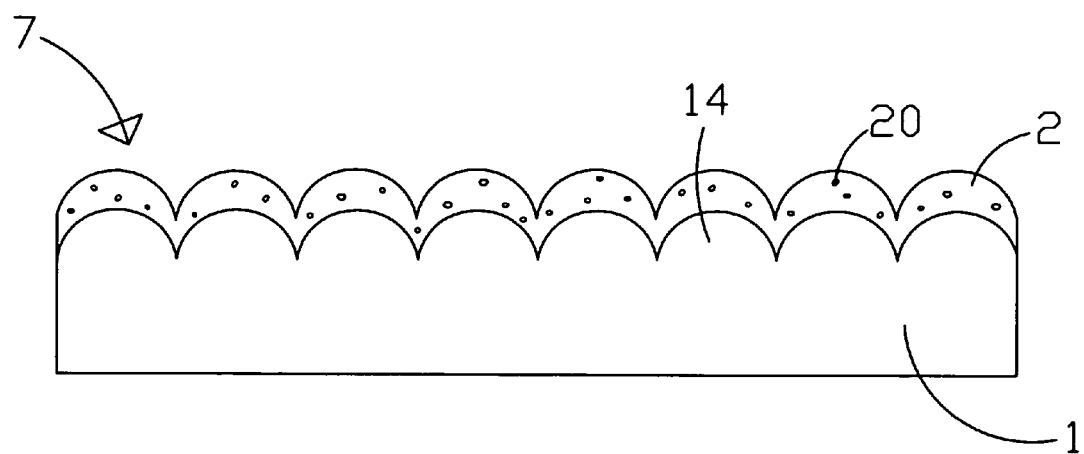
FIG. 2 is a schematic drawing of a diffuser plate of an embodiment in accordance with the present invention.

Refer to FIG. 2, a diffuser plate 7 includes a substrate 1 that is made from poly-methyl methacrylate/styrene copolymer, a Lenticular lens 14 disposed above one side of the substrate 1 for extending incident light to provide uniform light. Thus the amount of diffusion particles 20 being used is reduced and the light transmittance is increase so as to enhance brightness.

A diffusion layer 2 is arranged above the Lenticular lens 14 and is formed simultaneously with the substrate 1. The thickness of the diffusion layer 2 ranges from 30 μm to 500 μm while the material thereof is poly-methyl methacrylate/styrene copolymer. And a plurality of diffusion particles 20 made from PMMA, is added into the diffusion layer 2. The diameter of the particles ranges from 2 μm to 20 μm and the percent by weight of particles is from 0.5 to 20 percent weight. The diffusion layer 2 makes the light through the Lenticular lens 14 be scattered again so as to achieve high transmittance and high light diffusion effect.

The substrate 1 and the diffusion layer in this embodiment are made from transparent plastic material and are selected from one of the following materials: polycarbonate (PC), poly-methyl methacrylate/styrene copolymer (MS), cyclic olefins copolymer (COC), poly(ethylene terephthalate) glycol (PETG) and polymeric methyl methacrylate (PMMA), polystyrene (PS). The diffusion particles 20 is made from materials including silicon, titanium dioxide, silicon dioxide, poly-methyl methacrylate/styrene copolymer (MS), polymeric methyl methacrylate (PMMA), and polystyrene (PS). By co-extrusion, the diffusion layer 2 is set above the Lenticular lens 14 simultaneously with the disposition of the substrate 1 on the Lenticular lens 14. Therefore, it is easy to be mass-produced.

Figure 3:
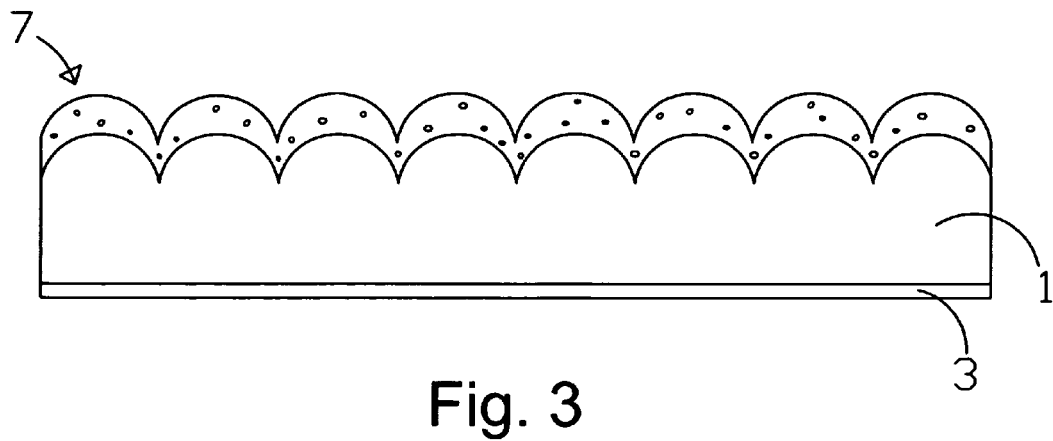
FIG. 3 is a schematic drawing showing an UV absorbing layer disposed under one side of a substrate of an embodiment in accordance with the present invention.

Refer to FIG. 3, a ultraviolet absorbing layer 3 is arranged on the other side of the substrate 1 so as to prevent degradation of the diffuser plate 7 such as cracks or yellowing caused by UV radiation. Thus lifetime of the diffuser plate 7 is extended.

Figure 4A:
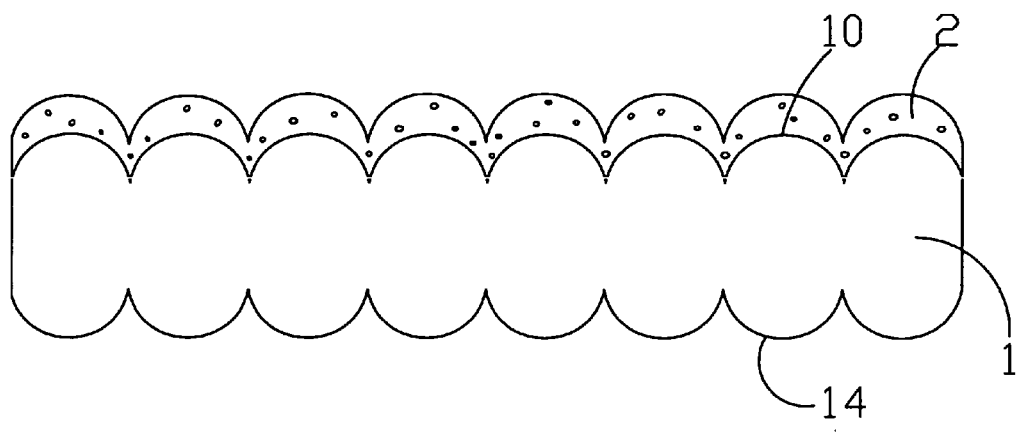
FIG. 4A is a schematic drawing showing a Lenticular lens disposed under one side of a substrate of an embodiment in accordance with the present invention.
Figure 4B:
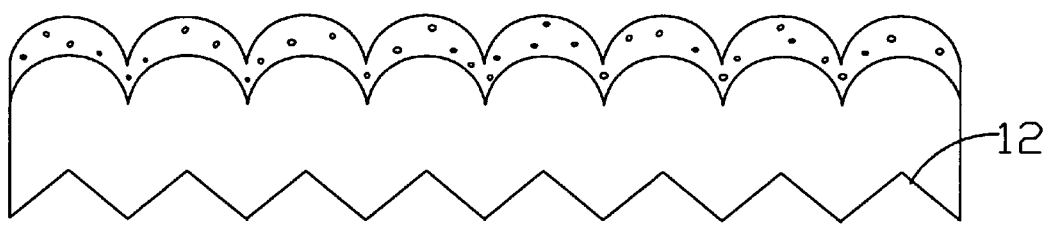
FIG. 4B is a schematic drawing showing a prism sheet disposed under one side of a substrate of an embodiment in accordance with the present invention.

Refer to FIG. 4A & FIG. 4B, an embodiment in accordance with the present invention with a Lenticular lens or a prism disposed under the other side of a substrate 1 is disclosed. The other side of the substrate 1 can be a plane, mirror surface, or mat surface with a Lenticular lens 14 so that the incident light passes through the side of the substrate 1, the optical lens 10 and the diffusion layer 2 for being diffused to create uniform light distribution and high efficiency of light diffusion effect. As shown in FIG. 4B, a prism 12 is arranged on the substrate 1 for enhancing brightness of the incident light.

Figure 5:
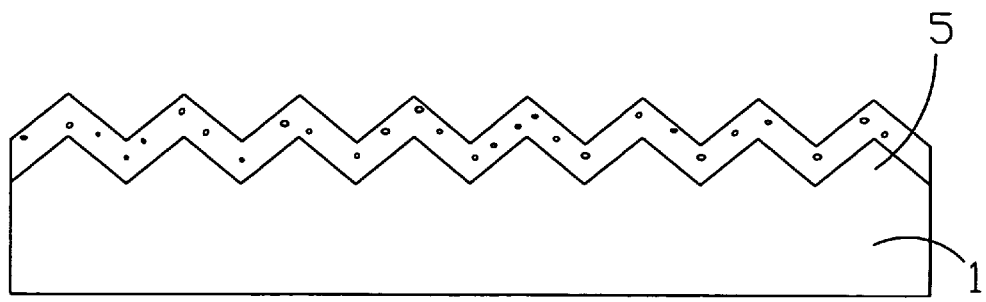
FIG. 5 is a schematic drawing showing a prism for condensing light disposed under one side of a substrate of an embodiment in accordance with the present invention.

Refer to FIG. 5, a prism sheet 5 is disposed above one side of the substrate 1 for increasing light output and on-axis brightness. The prism sheet 5 includes a condensing lens such as Fresnel lens.

Figure 6:
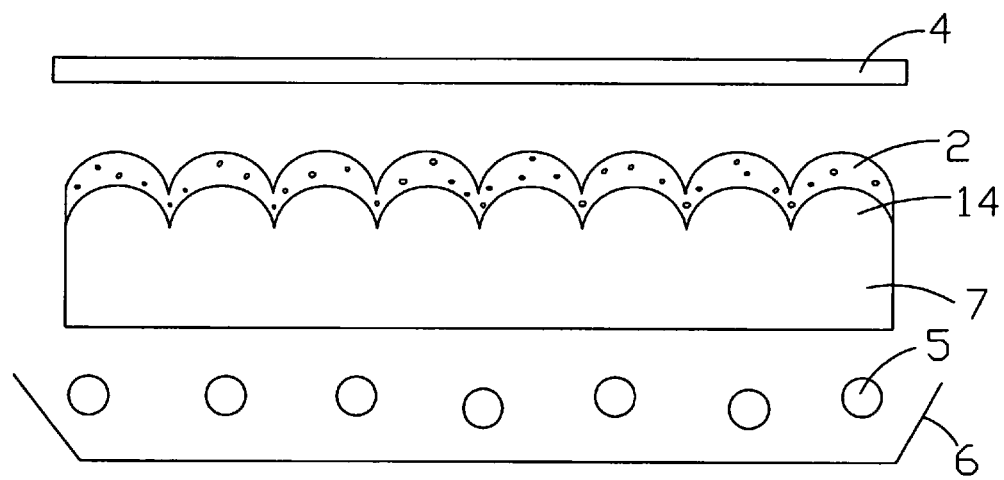
FIG. 6 is a schematic drawing showing a diffuser plate of the present invention being applied to backlight module.

Refer to FIG. 6, a backlight module in accordance with the present invention includes a reflector 6, a plurality of light sources 5 arranged above the reflector 6, a diffuser plate 7 disposed above the light sources 5, and a diffusion film 4 set above the diffuser plate 7. When light is emitted from the light sources 5 of the backlight module such as CCFL, LED or other planar light source, it passes a Lenticular lens 14 of the diffuser plate 7 and then through the diffusion layer 2 on surface of the Lenticular lens 14. The light is dispersed by surface of the Lenticular lens 14 and then is diffused by the diffusion layer 2 so as to achieve high transmittance and high diffusion efficiency. Compared with conventional structure, the present invention doesn't need the prism sheet 14' and the upper diffuser film 15' so that the cost is reduced.

In summary, the present invention provides a diffuser plate with higher light diffusion efficiency and brightness. By a diffusion layer and an optical lens, the diffuser plate increase light diffusion efficiency and enhances the brightness. Moreover, the design of a UV absorbing layer prevents aging and yellowing of the diffuser plate caused by long term exposure to UV radiation. On the other side of the substrate, a member for condensing light or diffusing light is disposed thereof to increase light diffusion efficiency and uniformity. Furthermore, the integration of the diffuser plate reduces usage of the diffuser sheet, prism sheet and the brightness enhancement film so that the cost is down.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A direct-type backlight LCD module comprising:
   a diffuser plate with higher light diffusion efficiency and brightness, said diffuser plate comprising a substrate with one side thereof being co-extruded into an optical lens; and a diffusion layer disposed above the optical lens, and a mirror or mat surface disposed on the other side of said substrate;
   a plurality of light sources disposed beneath the diffuser plate;
   a reflector disposed beneath the diffuser plate; and
   a diffusion film disposed above the diffuser plate.

2. The module as claimed in claim 1, wherein an ultraviolet (UV) absorbing layer is disposed under the other side of the substrate, on the same side as the light sources.

3. The module as claimed in claim 1, wherein the optical lens having a Lenticular lens, or prism lens.

4. The module as claimed in claim 1, wherein thickness of the diffusion layer ranges from 30 μm to 200 μm.

5. The module as claimed in claim 1, wherein a plurality of diffusion particles is added into the diffusion layer.

6. The module claimed in claim 5, wherein diameter of the diffusion particle ranges from 2 μm to 20 μm.

7. The module as claimed in claim 5, wherein percent by weight of the diffusion particles is from 0.5 to 20 percent weight.

8. The module as claimed in claim 5, wherein the diffusion particle is made from poly-methyl methacrylate/styrene copolymer (MS), poly methyl methacrylate (PMMA), polystyene(PS), silicon, titanium dioxide (TiO$_2$), or silicon dioxide (SiO$_2$).

9. The module as claimed in claim 1, wherein the substrate is made from polycarbonate (PC), poly methyl methacrylate (PMMA), poly-methyl methacrylate/styrene copolymer (MS), cyclic olefins copolymer(COC), poly(ethylene terephthalate) glycol (PETG) or polystyrene(PS).

10. The module claimed in claim 1, wherein the diffusion layer is made from polycarbonate (PC), poly methyl methacrylate (PMMA), poly-methyl methacrylate/styrene copolymer (MS), cyclic olefins copolymer (COC), poly(ethylene terephthalate) glycol (PETG) or polystyrene(PS).

* * * * *